United States Patent [19]

King et al.

[11] Patent Number: 5,478,509
[45] Date of Patent: Dec. 26, 1995

[54] PROCESS FOR REMOVING THE SOLVENT FROM A POLYMER SOLUTION

[75] Inventors: William R. King, Bartlesville, Okla.; Fred R. Feder, Collierville, Tenn.; Jean Naveau, Nivelles; Jean M. Mlinaric, Roux, both of Belgium

[73] Assignee: Fina Research, S.A., Feluy, Belgium

[21] Appl. No.: 50,019

[22] PCT Filed: Aug. 13, 1992

[86] PCT No.: PCT/US92/06924

§ 371 Date: Sep. 16, 1994

§ 102(e) Date: Sep. 16, 1994

[87] PCT Pub. No.: WO94/04333

PCT Pub. Date: Mar. 3, 1994

[51] Int. Cl.[6] .................................. B29B 9/10; B05B 9/00
[52] U.S. Cl. ...................................... 264/9; 264/13; 425/6

[58] Field of Search .......................... 264/5, 9, 13; 425/6

[56] References Cited

U.S. PATENT DOCUMENTS

| | | | |
|---|---|---|---|
| 4,778,835 | 10/1988 | Sittel et al. | 523/315 |
| 4,923,646 | 5/1990 | Kinsley, Jr. | 264/13 |

*Primary Examiner*—Mary Lynn Theisen
*Attorney, Agent, or Firm*—Michael J. Caddell; M. Norwood Cheairs

[57] ABSTRACT

The present invention relates to a continuous process for recovering polymer particles from a solution of polymer by evaporating the solvent from the solution by successively treating the solution into a first agitated vessel and treating the resulting polymer into a second agitated vessel. Furthermore, the invention relates to an apparatus for performing the aforesaid process for recovering polymer particles.

7 Claims, 2 Drawing Sheets

PROCESS FOR REMOVING THE SOLVENT FROM A POLYMER SOLUTION

The present invention relates to a process for forming polymer particles from a solution of polymer by evaporating the solvent from the solution.

Many prior art methods are known for the recovery of a polymer from its solution; however, there are many disadvantages to these methods such as inefficient use of energy, safety and health hazards, use of inert gas and mechanical problems.

U.S. Pat. No. 3,450,183 to Robert A. Hinton discloses a method for drying a polymer where the polymer solution is flashed below the melting point of the polymer to obtain an essentially dry or solid flash residue. The problem is that the method is only operable with those polymers that will flash to form an essentially dry solid, whereas if the polymer solution upon flashing retains enough solvent to be a sticky mass, the equipment will become all fouled up. A rubbery polymer solution is one example wherein after several stages of flash the rubber solution reaches a viscous stage which still is not dry, yet it cannot be pumped or handled otherwise either.

Another method is disclosed in U.S. Pat. No. 3,251,428 where a slurry of polyolefin is sprayed into a fluidised bed of polyolefin particles. The slurry coats the particles, then the hot vaporous solvent used to fluidise the bed vaporises any solvent remaining in the coating. Problems arise, however, when the polymer bed becomes too sticky to fluidise. Safety hazards are increased due to the use of the hydrocarbon as a fluidising medium. The system, as well, is generally inefficient energy-wise.

EP Patent 2271 to William R. King discloses a process where the polymer solution is introduced into a maintained bed of mechanically agitated polymer particles. This process requires the passage of an inert gas countercurrent to the polymer particles and the presence of initial solid particles (preferably of the same type of polymer as that which is to be recovered) to create a seed bed for the polymer particles to be treated.

This patent also claims a two-stage drying system where in addition to the disclosed purge column a conventional holding polisher is added in order to obtain better desolventizing yields. There are however, many disadvantages to use the teaching of this patent. The use of the countercurrent inert gas carries the fine particles to the top of the purge column which obliges to separate said fine particles from the inert gas in order to recycle the inert gas. Moreover it is necessary to stir the bed to prevent channeling of the inert gas. The movement of the bed causes agglomerates to form and float to the top of the bed. Eventually the entire bed is composed of large masses which defeat the purpose of the purge column and plug the product outlet opening. There are vortex problems arising in the purge column as mentioned in the patent. It is necessary to use a seed feed of polymer particles. There are mechanical problems due to the passage from the purge column to the holding polisher when the two-stage system is used. There are problems relating to the discharge of the polymer which is very sticky at the working temperatures. Furthermore, the long residence times often lead to the degradation of the polymer.

It is an object of the present invention to provide a continuous process for forming polymer particles from a solution of polymer which does not have the above identified drawbacks.

The present invention relates to a continuous process for recovering polymer particles from a solution of polymer by evaporating the solvent from the solution which process is characterised by introducing the solution of a polymer into at least two agitated vessels connected in series and further by removing substantially all the solvent by successively treating the solution into the first agitated vessel and treating the resulting polymer into the second agitated vessel.

Furthermore, the invention relates to an apparatus for performing the aforesaid process for recovering polymer particles.

The present invention overcomes the problems involved in the prior art methods of recovering a polymer from its solution. The present process is much more efficient in use of energy. It allows to work at lower temperatures. It decreases the risk of many safety and health hazards present in the prior art methods. Further, it is very less harmful for the polymer thanks to short residence times and low temperatures.

According to the present invention, the polymer solution is continuously introduced into the first agitated vessel and then treated into the second agitated vessel. The mechanical energy input provided by the mechanical agitation is used to remove the solvent from the solution. The resulting polymer is substantially free of solvent. According to the present invention it is not necessary to use a seed feed. No countercurrent inert gas is used which overcomes prior art problems. Furthermore the residence time of the polymer solution in the agitated vessels is much lower than the residence time when the purge column method is used.

The present invention is applicable to any polymer solutions. According to a preferred embodiment of the present invention, rubbery polymer solutions are treated. More particularly butadiene-styrene rubber solutions are treated. The process is also applicable to polymers which remain semi-fluid even when dry and cold, e.g. high cis-polybutadiene polymer solutions. According to the present invention it is possible to treat polymer solutions containing up to 95 wt % of solvent.

Operation of the process of the invention is usually at a temperature between the boiling point of the solvent and the degradation temperature of the polymer. For example, in the drying of a butadiene-styrene rubber copolymer in a solution of cyclohexane, the preferred operation temperature is 90°–140° C. Operation at a temperature slightly below the boiling point of the solvent is possible but at the expense of a longer residence time.

Although this is not necessary for performing the process of the present invention, operating below atmospheric pressure can be effective in reducing the temperature of the boiling point of the solvent. As indicated hereafter it is a preferred embodiment of the present invention that the pressure in the second agitated vessel is below atmospheric pressure and lower than the pressure in the first agitated vessel.

According to the present invention, the polymer solution is introduced into the first mechanically agitated vessel at a temperature sufficient to pump the polymer solution. The solvent is essentially removed by the energy input provided by the mechanical agitation present in the agitated vessel. The agitated vessel is outfitted with a rotor having blades made of rods and paddles characterised in that they scrape at least 70% of the internal surface of the vessel; scraping as used herein means that the paddles pass very closely to the surface without however being in contact therewith. Preferably, the paddles scrape at least 90% of the internal surface of the vessel. Although other heating means can contribute to the heat treatment of the polymer solution such as a heating vessel or a heating rotor, according to the present invention the heating of the polymer solution is preferably provided by the relative movement of the paddles.

According to a preferred embodiment of the present invention, the solution of polymer undergoes a flashing step at the introduction into the first agitated vessel, after having been heated to a temperature such as to vaporise a substantial portion of the solvent upon flashing. In this case, the preheating temperature must not be such as to cause thermal degradation of the polymer, but a maximum temperature without thermal degradation can be used. When used, the flashing of the solvent yields droplets of higher solid content. Generally, 25–70% of the solvent is removed in the spray flash depending on the characteristics of the polymer, the viscosity of the solution and its concentration.

After the first desolventising stage, the polymer solution is introduced into the second agitated vessel. The passage from the first to the second agitated vessel is preferably made through a quick-acting valve. According to a preferred embodiment of the present invention, the distance between the two agitated vessels is reduced as much as allowed by the size of said quick-acting valve. According to a preferred embodiment of the present invention, the pressure inside this second agitated vessel is below atmospheric pressure and lower than the pressure in the first agitated vessel. This pressure difference can be useful in order to make the polymer transfer between the first and the second agitated vessel easier. Moreover operating below atmospheric pressure is effective in reducing the temperature of the solvent's boiling point.

After the treatment in the second agitated vessel a polymer substantially free of solvent is recovered. According to the process of the present invention, it is possible to obtain residual amounts of solvent of less than 1% and preferably less than 0.1%.

According to a preferred embodiment of the present invention the dried polymer is recovered at the outlet of the second agitated vessel by a quick-acting discharge valve. Although any set of valves can be used, said valve is preferably a two-position rotary valve, wherein the rotary part contains a blind cavity, said valve being equipped with means for flushing the cavity with a gas. Preferably said valve is a ball valve or a cylindrical valve. Most preferably said valve is a ball valve.

According to a preferred embodiment of the present invention a stripping agent is added inside the second agitated vessel. This stripping agent, which is preferably water, lowers the vapor pressure of the solvent, avoids possible hot spots which would lead to the degradation of the polymer and improves the final removing of solvent.

In the first agitated vessel, the temperature is controlled by the amount of the polymer solution which is introduced. The rotation speed of the mechanical agitation device inside the agitated vessel is usually maintained constant during the treatment of the polymer solution. Therefore, the temperature inside the vessel is controlled by the amount of product which is continuously introduced. If the temperature inside the vessel is too high, more product is introduced and vice-versa. The temperature inside the second agitated vessel is controlled by the amount of energy dissipated by the mechanical agitation provided by the rotor and the rods. The temperature can also be controlled by, when used, the amount of stripping agent which is introduced inside the second agitated vessel.

As to the equipment used in the present invention, all equipment is conventional with the exception of the agitator paddles and the quick-acting discharge valve. The agitated vessel can be somewhat similar to polishers which are commercially available from equipment manufacturers such as Wedco, Inc., Bloomsbury, N.J. 08804.

An essential feature of the first agitated vessel according to the present invention is its paddles characterised in that they scrape at least 70% of the internal surface of the vessel, preferably at least 90% of the internal surface of the vessel.

In the first agitated vessel, the agitator paddles peripheral speed is preferably in the range of 850 to 1250 m/min, more preferably in the range of 1000 to 1100 m/min. A residence time of 1 to 8 minutes is generally adequate, with a time of 3 to 5 minutes preferred. The first agitated vessel can be vertically or horizontally disposed, but the horizontal position is preferred. A length/diameter ratio of 1.5 or more is preferred.

In the second agitated vessel, the agitator paddles peripheral speed is preferably in the range of 880 to 1420 m/min, more preferably in the range of 1080 to 1220 m/min. A residence time of 2 to 8 minutes is generally adequate, with a time of 3 to 5 minutes preferred. The second agitated vessel can be vertically or horizontally disposed, but the horizontal position is preferred. A length/diameter ratio of 1.5 or more is preferred.

An embodiment of the invention is illustrated in the accompanying drawings, of which:

FIG. 1 illustrates one embodiment of the present invention using two horizontal agitated vessels connected in series.

Figure 1:
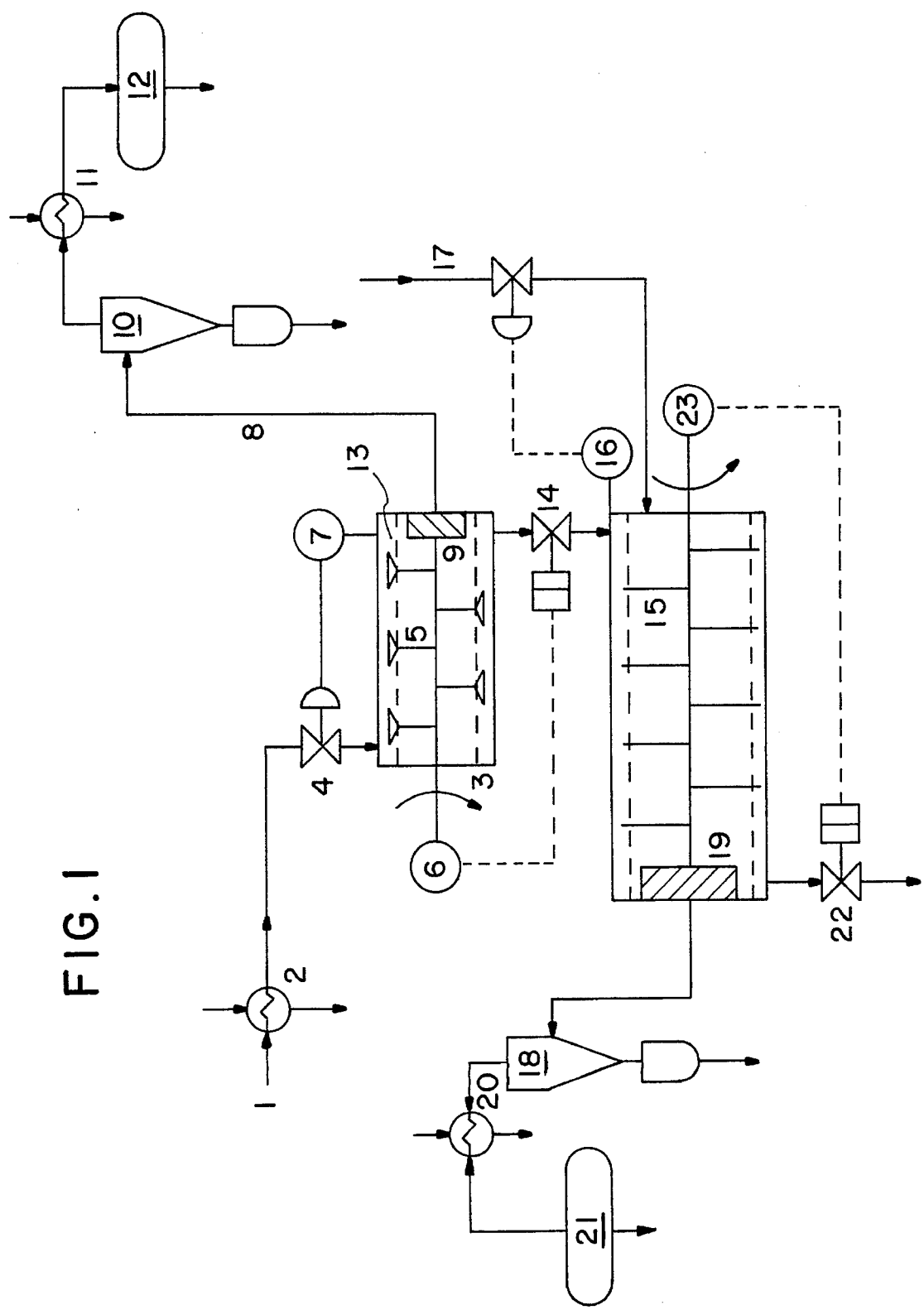
FIG. 1 shows the general scheme of the process according to the present invention.

The feed (1) comprising the polymer solution is preheated in a heat exchanger (2) and fed to the first agitated vessel (3) through a rate control valve (4). Flashing of the solution occurs after this control valve which removes a certain amount of the solvent. The rotating blades (5) inside the first agitated vessel are made of rods and triangular paddles which scrape the internal surface of the vessel. The blades are driven by an electrical motor (6). The temperature (7) inside the first agitated vessel is controlled by the feed rate (4) of the polymer solution. The dry solvent vapors (8) are separated from the powder by a fan plate (9) which rotates with the shaft.

The centrifugal force generated by the rotation of the fan plate propels the powder particles to the periphery of the vessel. The powder which goes through the separating fan plate is separated from the dry solvent vapors in a cyclone (10).

The dry solvent vapors are condensed in a water cooled condenser (11), the condensed solvent is accumulated in a tank (12) and recycled. In the first agitated vessel, due to the centrifugal force, the polymer powder concentrates along the wall of the vessel and forms a moving layer (13).

The transfer of the polymer from the first to the second agitated vessel is made through a quick-acting valve (14) and is controlled by the power consumption of the motor. This quick acting valve is built in such a way that the distance between the agitated vessels is minimum. The pressure inside the second agitated vessel is preferably below atmospheric pressure and lower than the pressure in the first agitated vessel. This makes easier the transfer between the two agitated vessels. The rotating blades (15) inside the second agitated vessel are made of rods.

The temperature (16) inside the second vessel is controlled by the addition of demineralized water (17). The water also acts as a stripping agent and helps to the removal of solvent.

The solvent and water vapors are separated from the polymer powder by the same system as in the first agitated vessel (fan plate (19)). The powder which goes through the separating fan plate is separated from the wet solvent vapors in a cyclone (18). The vapors are condensed in a water cooled condenser (20) and are accumulated in a vessel (21) where the water decants and is separated from the solvent.

The discharge of the polymer powder from the second agitated vessel is made through a quick-acting discharge valve (22) and is controlled by the power consumption of the electrical motor (23).

Figure 2:
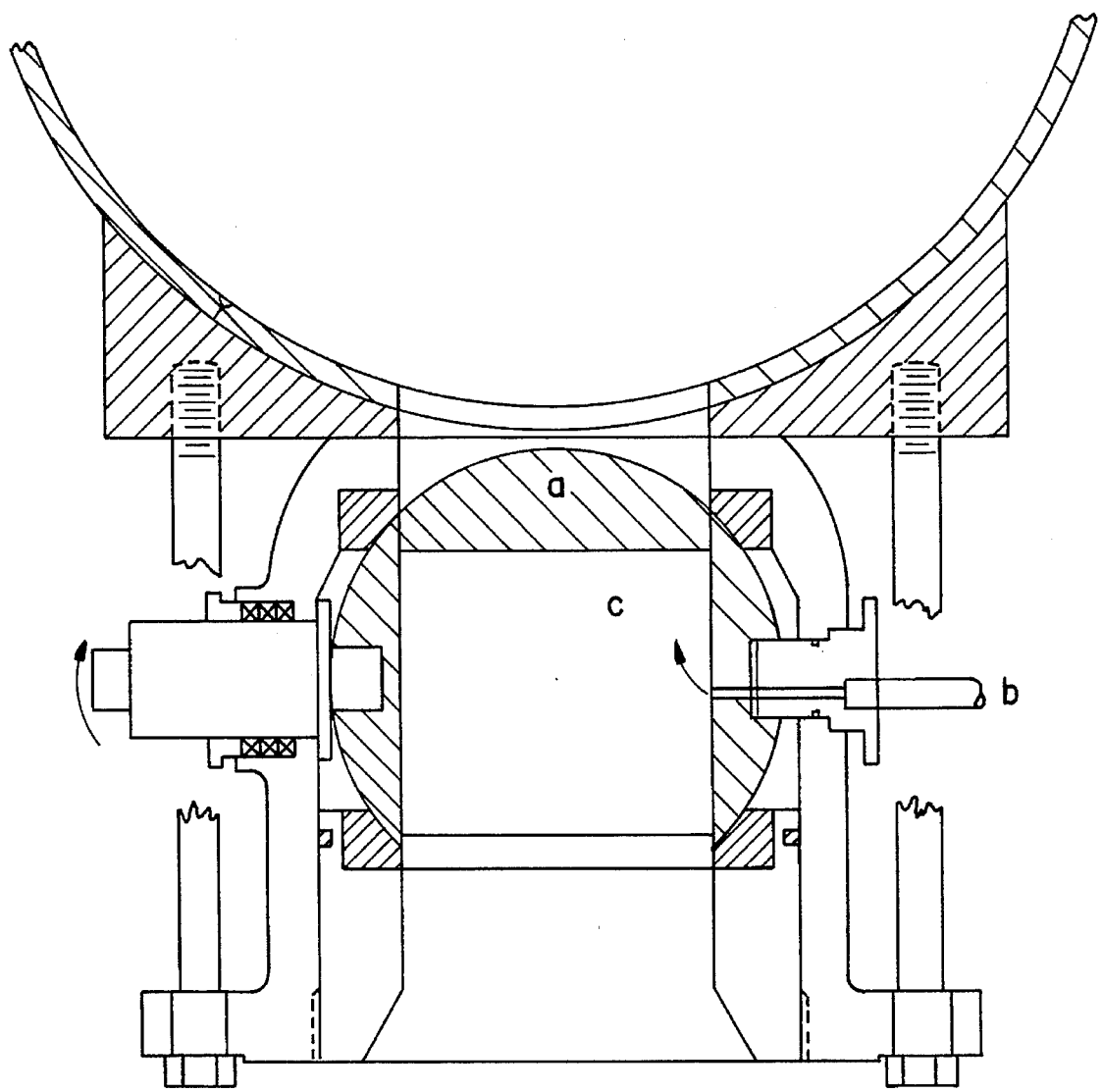
FIG. 2 shows a quick-acting discharge valve.

FIG. 2 illustrates an embodiment of a quick-acting discharge valve (22) represented by a ball valve used according to the present invention. This ball valve is blinded on one side and acts like a cup. During operation, the valve is positioned with the blind face (a) on the polymer side (home position). When the power consumption of the motor reaches its set point, a nitrogen flow (b) flushes the cavity (c) in order to avoid introduction of oxygen in the vessel and the valve rotates 180° (fill position). The cavity is filled with polymer and the valve rotates another 180° to come back to the home position. A nitrogen flow in the cavity flushes out the polymer and the valve is ready for another cycle. The polymer is conveyed to a cooling section and falls into a box.

Another embodiment of a quick-acting discharge valve is a cylindrical valve which could be represented by a figure similar to FIG. 2 excepted for the axis of rotation; for a cylindrical valve the axis of rotation would be perpendicular to the two axis of rotation represented in FIG. 2 and the means for rotation would be in line with this axis of rotation.

The present invention will now be illustrated by some examples.

EXAMPLE 1

A polymer solution consisting of 30 wt % rubber in cyclohexane is preheated at a temperature of 154° C. It is then introduced at a rate of 100 kg/h of rubber and flashed inside the first agitated vessel. The diameter of the first agitated vessel is of 30 cm. The rotation speed of the blades inside the first agitated vessel is of 1150 RPM, the temperature is of 127° C. and the pressure is atmospheric. The rubber solution at the outlet of the first agitated vessel contains 4.8 wt % cyclohexane. The solution is then introduced into the second agitated vessel wherein the pressure is of 16920 Pa and the temperature is of 104° C. The diameter of the second agitated vessel is of 40 cm. The rotation speed of the blades is of 1100 RPM. The rubber discharged through a discharge ball valve contains 0.08 wt % of cyclohexane.

EXAMPLES 2 TO 8

The same polymer solution as in example 1 is used. The pretreating temperature is of 154° C. The pressure inside the first agitated vessel is atmospheric. The pressure inside the second agitated vessel is of 16920 Pa. The rotation speed of the rods inside the second agitated vessel is of 1100 RPM.

The other characteristics are given in the following table.

| Example | t (°C.) 1st agitated vessel | t (°C.) 2nd agitated vessel | Flow (kg/h) vessel | Rotation speed (RPM) 1st agit. ves. | Residual solvent (%) |
|---|---|---|---|---|---|
| 2 | 127 | 104 | 81.6 | 1028 | 0.12 |
| 3 | 93 | 138 | 79.4 | 1028 | 0.06 |
| 4 | 127 | 138 | 80.7 | 1157 | 0.07 |
| 5 | 127 | 138 | 99.4 | 1028 | 0.11 |
| 6 | 127 | 121 | 89.4 | 1093 | 0.07 |
| 7 | 110 | 138 | 88.5 | 1093 | 0.07 |
| 8 | 110 | 121 | 90 | 1093 | 0.09 |

We claim:

1. Process for forming polymer particles from a solution of polymer, said process comprising the steps of introducing the solution of polymer into a first agitated vessel which is outfitted with a rotor having blades made of rods and paddles which scrape at least 70% of the internal surface of the vessel and which provide by their relative movement the heating of the polymer solution introducing the resulting polymer solution into a second agitated vessel recovering a polymer substantially free of solvent.

2. Process according to claim 1 characterized in that the pressure inside the second agitated vessel is below atmospheric pressure and lower than the pressure inside the first agitated vessel.

3. Process according to claim 1 characterized in that the solution of polymer undergoes a flashing step at the introduction into the first agitated vessel, after having been heated to a temperature such as to vaporise a substantial portion of the solvent upon flashing.

4. Process according to claim 1 characterized by the addition of a stripping agent inside the second agitated vessel.

5. Process according to claim 1, wherein recovery of the polymer substantially free of solvent comprises the steps of when the power consumption of the second agitated vessel reaches a set point, flushing with nitrogen a quick-acting discharge valve having a blind face and a cavity with said cavity being initially positioned away from the polymer rotating the valve to communicate the cavity with the polymer filling the cavity with polymer rotating the cavity back to its initial position flushing the polymer out of the cavity.

6. Apparatus for forming polymer particles from a solution of polymer by removing substantially all the solvent from said solution, said apparatus comprising two agitated vessels connected in series, characterized by the fact that the first agitated vessel is outfitted with a rotor having blades made of rods and paddles which scrape at least 70% of the internal surface of the vessel and which provide by their relative movement the heating of the polymer solution and the second agitated vessel is outfitted with a rotor having blades made of rods which provide by their relative movement the heating of the polymer solution.

7. Apparatus according to claim 6 further comprising a quick-acting discharge valve which recovers the polymer powder at the outlet of the second agitated vessel, said valve being a two-position rotary valve, wherein the rotary part contains a blind cavity, said valve being equipped with means for flushing the cavity with a gas.

* * * * *